(12) United States Patent
Keller

(10) Patent No.: US 7,798,568 B2
(45) Date of Patent: Sep. 21, 2010

(54) SUNSHADE ASSEMBLY AND OPEN ROOF CONSTRUCTION PROVIDED THEREWITH

(75) Inventor: Dave Keller, Ortonville, MI (US)

(73) Assignee: Inalfa Roof Systems Group B.V., Venray (NL)

( * ) Notice: Subject to any disclaimer, the term of this patent is extended or adjusted under 35 U.S.C. 154(b) by 3 days.

(21) Appl. No.: 12/349,233

(22) Filed: Jan. 6, 2009

(65) Prior Publication Data

US 2010/0032991 A1   Feb. 11, 2010

Related U.S. Application Data

(63) Continuation-in-part of application No. 12/186,876, filed on Aug. 6, 2008.

(51) Int. Cl.
*B60J 7/043* (2006.01)
(52) U.S. Cl. ............... 296/214; 296/141; 160/273.1
(58) Field of Classification Search ........ 296/214, 296/141, 143; 160/273.1
See application file for complete search history.

(56) References Cited

U.S. PATENT DOCUMENTS 6,691,761 B1 * 2/2004 Alkhoury et al. ......... 160/273.1

2007/0205636 A1 * 9/2007 Gonzalez Merino et al. 296/214
2009/0145559 A1 * 6/2009 Glasl et al. ............... 160/273.1

OTHER PUBLICATIONS

Office Action for U.S. Appl. No. 12/186,876, mailed Dec. 7, 2009.

* cited by examiner

*Primary Examiner*—Dennis H Pedder
(74) *Attorney, Agent, or Firm*—Steven M. Koehler; Westman, Champlin & Kelly, P.A.

(57) ABSTRACT

A sunshade assembly comprises a flexible sunscreen having opposed longitudinal edges and opposed transversal edges, two opposed longitudinal guides for receiving therein and guiding corresponding ones of the opposed longitudinal edges of the sunscreen, a rotatable winding shaft configured for winding an unwinding the sunscreen at first one of its transversal edges, and an operating beam connected to the second one of the transversal edges of the sunscreen. Each of the opposed longitudinal edges of the sunscreen near to the second one of the transversal edges is provided with a wing folded inwards around a positioning member having a stationary position relative to said second transversal edge and extending into a corresponding one of said opposed longitudinal guides.

28 Claims, 4 Drawing Sheets

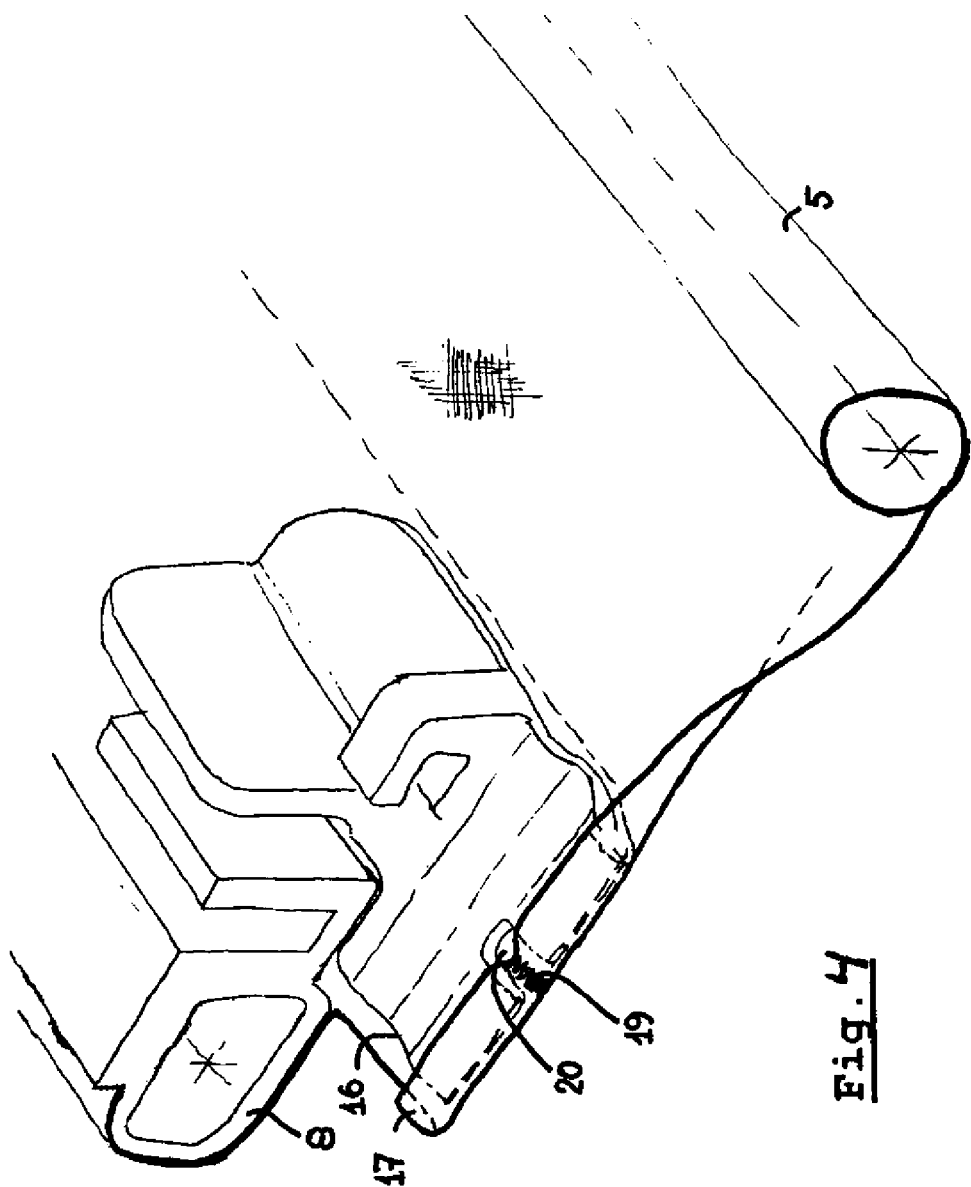

SUNSHADE ASSEMBLY AND OPEN ROOF CONSTRUCTION PROVIDED THEREWITH

CROSS-REFERENCE TO RELATED APPLICATION

This application is a continuation-in-part and claims priority under 35 U.S.C. 120 of U.S. patent application Ser. No. 12/186,876, filed Aug. 6, 2008, the content of which is herein incorporated by reference in its entirety

BACKGROUND

The discussion below is merely provided for general background information and is not intended to be used as an aid in determining the scope of the claimed subject matter.

Aspects of the invention firstly relate to a sunshade assembly, comprising a flexible sunscreen, a rotatable winding shaft for winding and unwinding the sunscreen, and an operating beam connected to the sunscreen. One important field of application of such sunshade assemblies are vehicles which are provided with open roof constructions having roof assemblies. Such sunshade assemblies may be integrated into such roof assemblies of open roof constructions during the construction of the vehicles, but also may be provided afterwards (in which case the vehicles are retrofitted with a so-called after market open roof construction).

A problem with such sunshade assemblies may occur when a longitudinal edge of the flexible sunscreen moves out of the corresponding longitudinal guide, for example by wind loads or by being pushed unintentionally by a user. Again moving said longitudinal edge into said longitudinal guide then may be a difficult task.

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the background.

In accordance with an aspect of the present invention a sunshade assembly comprises a flexible sunscreen having opposed longitudinal edges and opposed transversal edges; two opposed longitudinal guides for receiving therein and guiding corresponding ones of the opposed longitudinal edges of the sunscreen; a rotatable winding shaft configured for winding and unwinding the sunscreen at a first one of its transversal edges; an operating beam connected to the second one of the transversal edges of the sunscreen; wherein each of the opposed longitudinal edges of the sunscreen near to the second one of the transversal edges is provided with a wing folded inwards around a positioning member having a stationary position relative to said second transversal edge and extending into a corresponding one of said opposed longitudinal guides.

As a result of such a wing folded inwards around said positioning member the longitudinal edges of the sunscreen remain more safely in the corresponding guides. Moreover, when a longitudinal edge is moved out of a corresponding guide, completely winding the sunscreen onto the winding shaft and thereafter unwinding it therefrom fully restores the correct position of the sunscreen, i.e. with its longitudinal edges received in the corresponding guides.

In any unwound or partially unwound position the sunscreen at each of its longitudinal edges comprises a transitional area of the wing from the folded configuration near to the second transversal edge (near to the operating beam) towards a flat configuration closer to the winding shaft. When the sunscreen is wound onto the winding shaft it will flatten shortly before reaching said winding shaft.

It is noted that the phrase "folded inwards" does not necessarily mean that the inwardly folded part of the sunscreen rests upon or engages the unfolded part of the sunscreen.

In an embodiment the longitudinal guides each comprise two guide channels positioned one above the other, and wherein each positioning member extends in a first one of said two guide channels, whereas the operating beam comprises opposite lateral ends each extending into a corresponding second one of said two guide channels.

For example it is possible that each positioning member extends in a lower one of said two guide channels, whereas each of the lateral ends of the operating beam extends into a corresponding upper one of said two guide channels.

Further it is possible that said positioning member is connected to the operating beam in a releasable manner, for example when the positioning member together with the operating beam defines a snap connection.

It should be noted, however, that also other constructive features could be applied with which a releasable connection between the positioning member and operating beam may be realised. Such other types may be of a type being operated manually, or of a type needing some tool to be operated.

In still another embodiment the sunshade assembly comprises two longitudinal drive members housed in said longitudinal guides engaging opposite lateral ends of the operating beam and capable of a reciprocating movement in said guides.

In an embodiment of the sunshade assembly each longitudinal edge of the sunscreen is folded inwards such that the folded part thereof is positioned above the unfolded part thereof. Such a configuration may improve the tendency of the sunscreen to flatten out when reaching the winding shaft.

The invention secondly relates to an open roof construction or roof assembly kit for a vehicle having an opening in a stationary roof. The kit comprises a movable closure panel configured for opening and closing said roof opening and a sunshade assembly having one or more features herein described.

BRIEF DESCRIPTION OF THE DRAWINGS

Hereinafter the invention will be elucidated while referring to the drawing, in which:

FIG. 4 shows another embodiment, schematically and in a perspective view.

DETAILED DESCRIPTION OF THE ILLUSTRATIVE EMBODIMENTS

Figure 1:
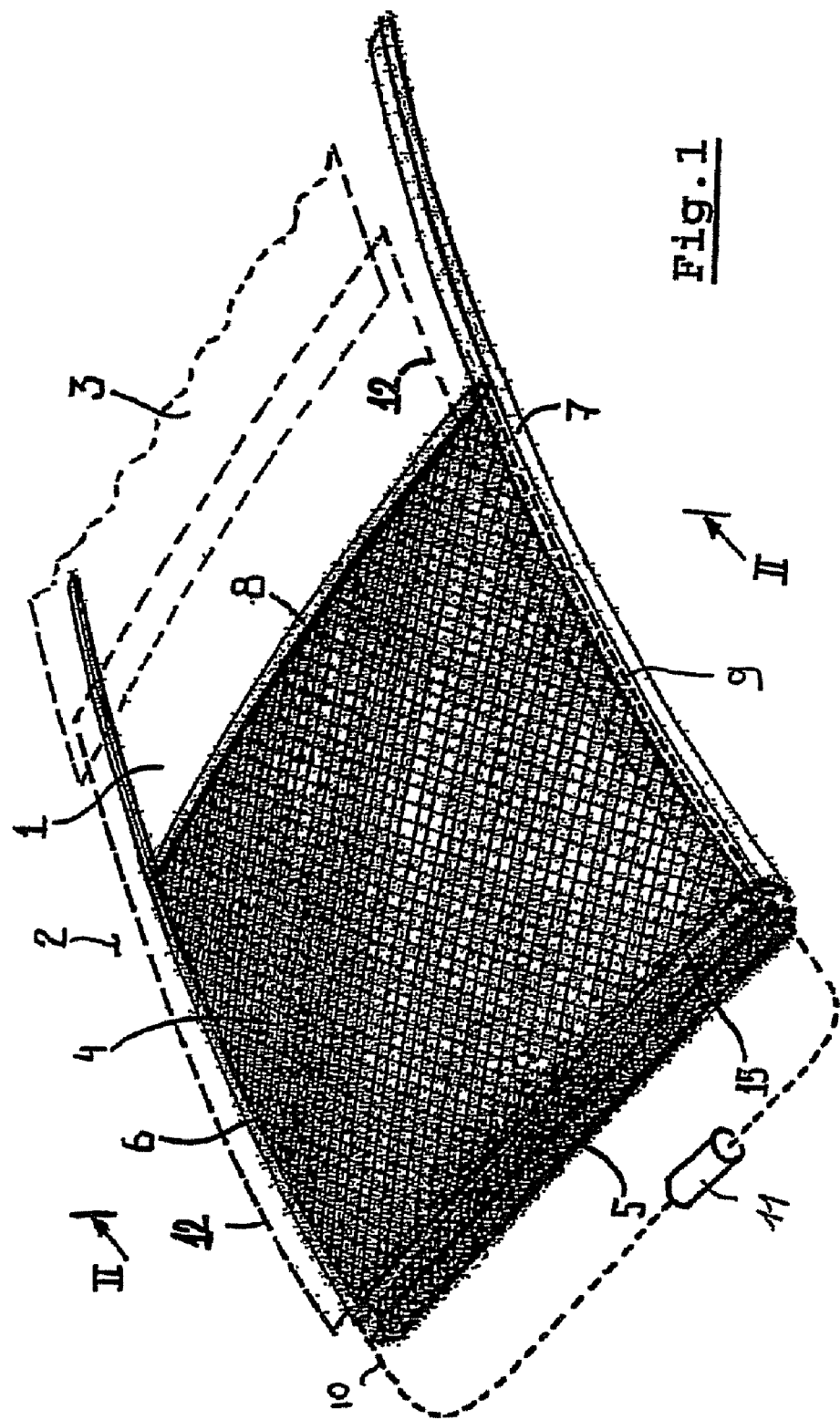
FIG. 1 shows, schematically and in a perspective view, a sunshade assembly applied to an open roof construction.

Firstly referring to FIG. 1, an open roof construction having a roof assembly for a vehicle (schematically represented by a stationary roof 2) is illustrated schematically. Said roof assembly is for opening and closing a roof opening 1 in a stationary roof part 2 of the vehicle and includes a movable closure panel 3 which, by means not illustrated in detail but known per se, can be moved for opening and closing said roof opening 1. Commonly, as is known, the movable panel 3 is guided in longitudinal guides mounted in or formed in the stationary roof part 2 along longitudinal sides 12 of the roof opening 1. A user operated device such as a motor or crank (not illustrated) is operably coupled to the panel 3 via cables or the like to move the panel 3 selectively between its open and closed positions. In FIG. 1 the closure panel 3 has been illustrated in a position in which it opens the roof opening 1.

Below the roof opening 1 a sunshade assembly is positioned. Basically, said sunshade assembly comprises a flexible sunscreen 4, a rotatable winding shaft 5 for winding and unwinding the sunscreen 4 at a first transversal edge and two opposite longitudinal guides 6 and 7. The guides 6, 7 can be connected to or formed integral from a single unitary body with the guides of the closure panel (not illustrated). Likewise, the guides 6, 7 can be separate from the guides of the panel, in which case the open roof construction comprises a kit, the minimum of which does further include the panel 3 besides the sunshade assembly. Drive members may be provided, which in FIG. 1 have been illustrated schematically by dotted lines 9, 10. As is known per se, the drive members may comprise longitudinal members driven by an actuator 11 for a reciprocating movement for winding and unwinding the sunscreen 4.

Each drive member 9, 10 is connected to an operating beam 8 provided at and connected to a transversal edge of the sunscreen 4 remote from the winding shaft 5.

Although the reciprocating movement of the sunscreen 4 primarily is generated by the reciprocating movement of the drive members 9 and 10 as caused by the actuator 11, it is possible too that in addition the winding shaft 5 is preloaded in a sense for winding the sunscreen 4 thereon. Further it should be noted that the movement of the sunscreen 4 also may be initiated manually.

Figure 2:
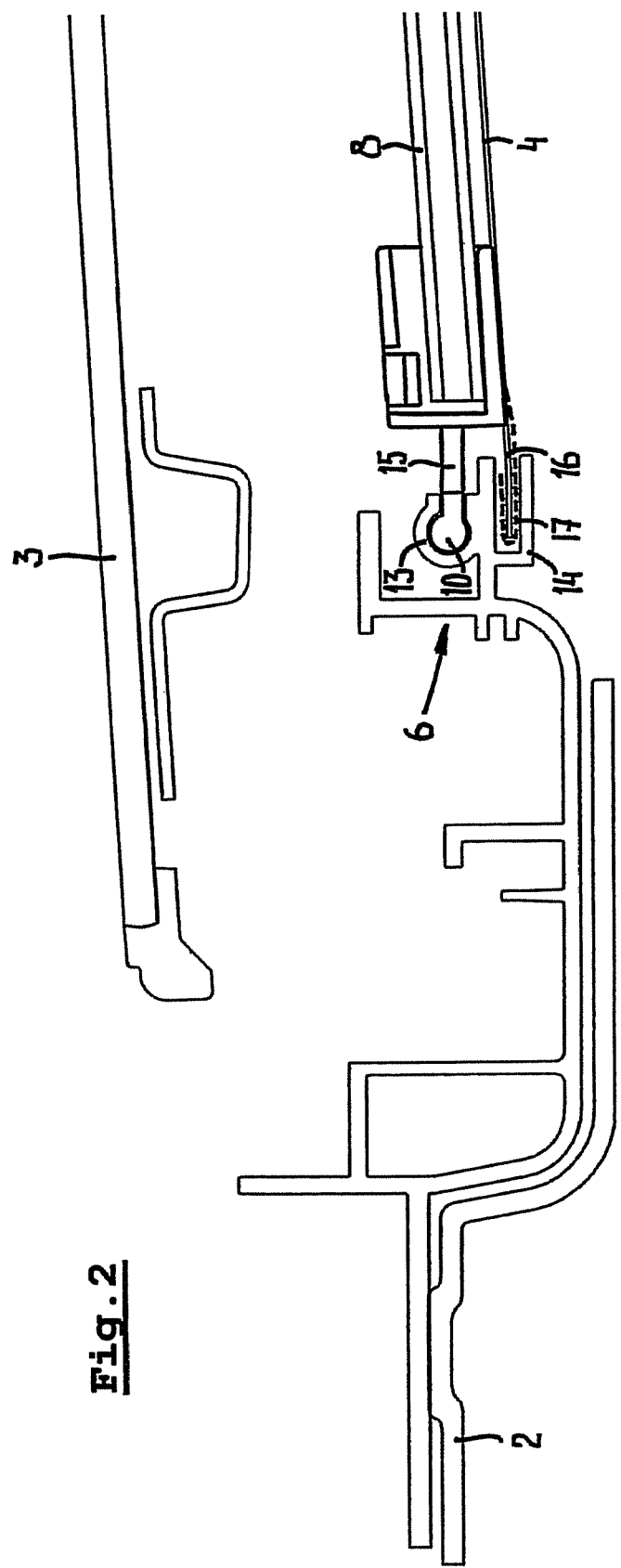
FIG. 2 shows, schematically and in a transverse cross section, a detail of the sunshade assembly.

Now, reference is made to FIG. 2 which schematically illustrates a transverse cross section according to II-II in FIG. 1 (it is noted that only the left half of the cross section is shown, the right half being a mirror image thereof).

FIG. 2 shows the panel 3, left guide 6 (attached to the stationary roof part 2) and operating beam 8. The sunscreen 4 is attached to the operating beam 8 in a manner known and not further elucidated here.

The guide 6 comprises an upper guide channel 13 and a lower guide channel 14. The operating beam 8 has attached to its outer end a mounting part 15 which protrudes into the upper guide channel 13 and which is connected therein to drive member (e.g. cable) 10. Thus, the operating beam 8 comprises opposite lateral ends each extending into a corresponding upper guide channel 13 and being guided therein.

The corresponding longitudinal edge of the sunscreen 4 will be guided in the lower guide channel 14.

It is noted that the mounting part 15 may or may not protrude fully into the guide channel 13, basically depending upon the shape of the guide channel 13 and the shape of the mounting part 15. Thus, the phrase "extending into a corresponding upper guide channel" has to be taken not too literally. Stated another way mounting part 15 engages guide 13 so as to be guided thereby, the guide 13 of which may or may not comprise a channel.

Figure 3:
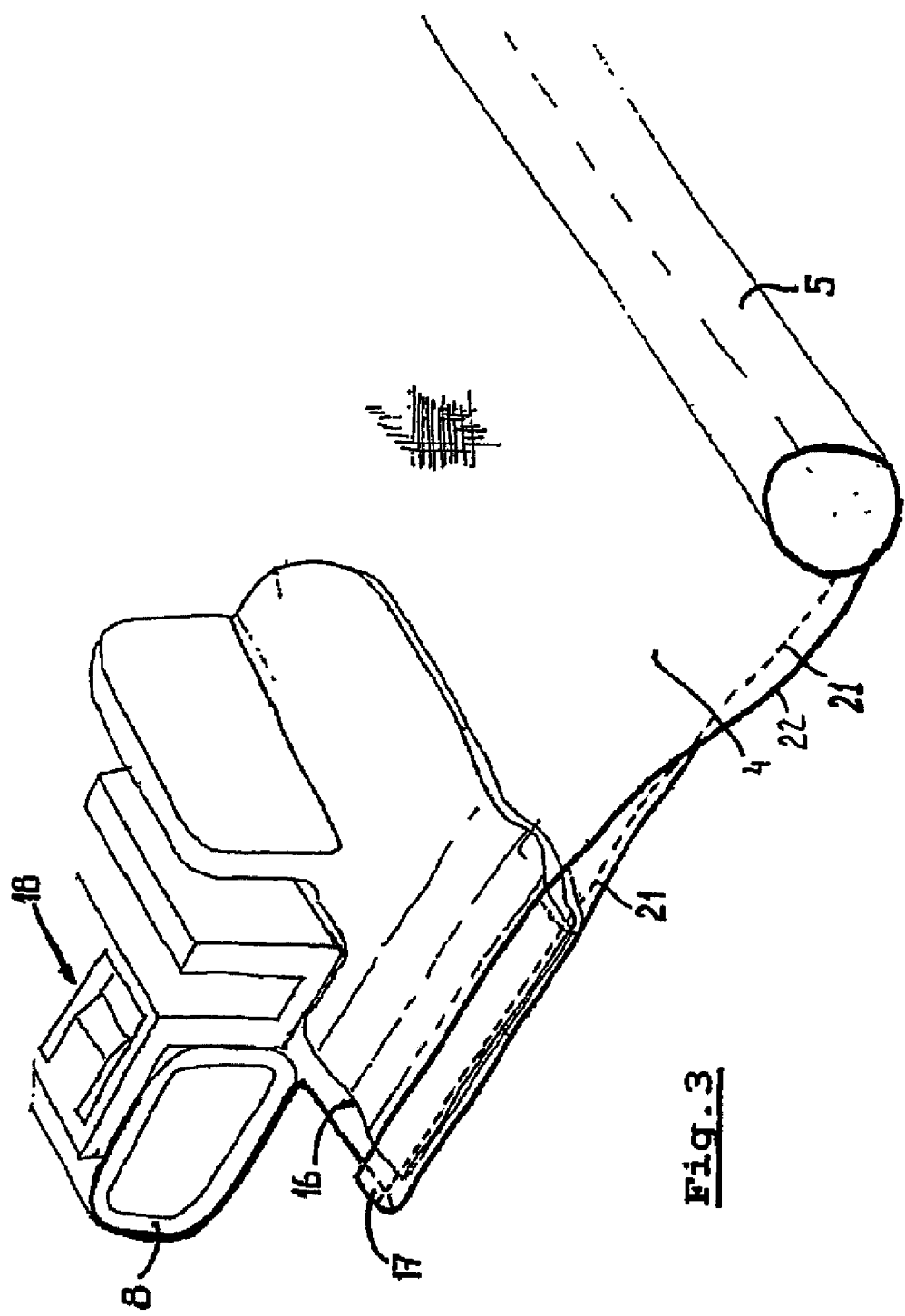
FIG. 3 shows, schematically and in a perspective view, a part of the sunshade assembly for illustrating its operation.

A positioning member 16 is attached to the operating beam in a manner to be described later, and extends into, and is guided by, lower guide channel 14. As indicated by a dotted line, a wing 17 of the sunscreen 4 is folded around said positioning member 16. This wing 17 may be an integral part (transverse prolongation such as being formed from a single unitary body) of the sunscreen 4, as illustrated in FIG. 4, or may be a separate part 22 attached to the sunscreen 4 in any appropriate manner (e.g. stitching 21 as illustrated in FIG. 3, gluing etc). In the illustrated embodiment the positioning member 16 is embodied as a lip.

Referring to FIG. 3, part of the operating beam 8 near its left end is shown. Its mounting part 15 has been omitted in this view. The guide 6 with upper guide channel 13 and lower guide channel 14 also has been omitted in this view to more clearly show the positioning member or lip 16.

The positioning member 16 can be attached to the operating beam 8 through a snap connection (generally indicated by reference 18). Thus a releasable connection between the operating beam 8 and positioning member 16 can be created (e.g. for making assembly/disassembly of these parts, and thus the sunshade assembly, easier). However, in another embodiment as illustrated in FIG. 4, the positioning member 16 can be integral with the operating beam 8 being formed from a single unitary body.

From FIG. 3 it appears that the wing 17 of the sunscreen 4 gradually unfolds in a direction towards the winding shaft 5. In any unwound or partially unwound position the sunscreen 4 at each of its longitudinal edges comprises a transitional area of the wing 17 from the folded configuration near to the second transversal edge (near to the operating beam 8) towards a flat configuration closer to the winding shaft 5. When the sunscreen 4 is wound onto the winding shaft 5 it will flatten shortly before reaching said winding shaft 5.

When, in a fully or partially closed position of the sunscreen 4 a longitudinal edge thereof comes out of the lower guide channel 14, the position thereof can be restored by fully opening the sunscreen (winding it onto the winding shaft 5) and again moving it to a (partially) closed position. The wing 17 extending around the lip 16 will take care of again positioning the longitudinal edge of the sunscreen into the corresponding lower guide channel 14.

FIG. 4 illustrates a second embodiment that can provide better control of the shape of the sunshade 4 when wound onto the winding shaft 5, especially under conditions, such as low temperatures. In general, the wing 17, or portion thereof, is arranged to provide engagement between the wing 17, or portion thereof, with the positioning member 16 so that the wing 17 will not shift (or minimally shift) relative to the positioning member 16. Generally, a connection 19 is formed to accomplish this engagement. In the illustrated embodiment, the connection 19 comprises attachment of the upper and lower part of the flexible material forming wing 17 through an aperature 20 in the positioning member 16. The aperature 20 can comprise a hole; however, in an another embodiment as illustrated, the aperature 20 comprises a recess extending inwardly from a longitudinal edge of the positioning member 16. The connection 19 may be a stitch seam, glue connection, weld, a fastener such as a rivot, or combinations thereof, or the like. Use of the recess, allows easy assembly of the wing 17 to the positioing member 16. It should be noted in yet a further embodiment, the connection 19 can comprise a direct connection between positioning member 16 and wing 17 such as via a fastener, weld or adhesive. Although illustrated where a single connection 19 is provided, this should not be considered limiting in that additional connections 19 in any one or combination of forms provided above.

Although the subject matter has been described in a language specific to structural features and/or methodological acts, it is to be understood that the subject matter defined in the appended claims is not necessarily limited to the specific features or acts described above as has been determined by the courts. Rather, the specific features and acts described above are disclosed as example forms of implementing the claims.

What is claimed is:

1. A sunshade assembly comprising:
   a flexible sunscreen having opposed longitudinal edges and opposed transversal edges;
   two opposed longitudinal guides for receiving therein and guiding corresponding ones of the opposed longitudinal edges of the sunscreen;
   a rotatable winding shaft configured for winding and unwinding the sunscreen at a first one of its transversal edges;
   an operating beam connected to the second one of the transversal edges of the sunscreen;
   two positioning members joined to and movable with the operating beam, wherein each positioning member extends into a corresponding one of said opposed longitudinal guides, and wherein material of the sunscreen near to the second one of the transversal edges is provided with a wing folded inwards around each of the positioning members, and wherein the material of the sunscreen is unfolded in a direction toward the rotatable winding shaft to obtain a flat configuration for winding on the rotatable winding shaft.

2. The sunshade assembly according to claim 1, wherein the longitudinal guides each comprise two guide channels positioned one above the other, and wherein each positioning member extends in a first one of said two guide channels, whereas the operating beam comprises opposite lateral ends each extending into a corresponding second one of said two guide channels.

3. The sunshade assembly according to claim 2, wherein each positioning member extends in a lower one of said two guide channels, whereas each of the lateral ends of the operating beam extends into a corresponding upper one of said two guide channels.

4. The sunshade assembly according to claim 1, wherein said positioning member comprises a lip projecting into the corresponding guide and wherein material of the corresponding wing of the sunscreen is folded around said lip.

5. The sunshade assembly according to claim 1, wherein said positioning member is connected to the operating beam in a releasable manner.

6. The sunshade assembly according to claim 5, wherein the positioning member together with the operating beam defines a snap connection.

7. The sunshade assembly according to claim 1, wherein said positioning member is an integral part of the operating beam being formed from a single unitary body.

8. The sunshade assembly according to claim 1, comprising two longitudinal drive members housed in said longitudinal guides engaging opposite lateral ends of the operating beam and capable of a reciprocating movement in said guides.

9. The sunshade assembly according to claim 1, wherein material of each wing of the sunscreen is folded inwards such that a folded part thereof is positioned above an unfolded part thereof.

10. The sunshade assembly according to claim 1, wherein each wing is an integral prolongation of the sunscreen.

11. The sunshade assembly according to claim 1, wherein each wing is a separate part attached to the sunscreen.

12. The sunshade assembly according to claim 1 and further comprising a connection between each of the positioning members and at least a portion of the corresponding wing.

13. The sunshade assembly according to claim 12 wherein the connection comprises an aperture formed in each positioning member and wherein opposed surfaces of each corresponding wing are secured together through the aperture.

14. The sunshade assembly according to claim 13 wherein each aperture comprises a recess extending from a longitudinal edge of each corresponding positioning member.

15. A roof assembly kit for a vehicle having an opening in a stationary roof, the kit comprising:
   a movable closure panel configured for opening and closing said roof opening; and
   a sunshade assembly comprising:
      a flexible sunscreen having opposed longitudinal edges and opposed transversal edges;
      two opposed longitudinal guides for receiving therein and guiding corresponding ones of the opposed longitudinal edges of the sunscreen;
      a rotatable winding shaft configured for winding and unwinding the sunscreen at a first one of its transversal edges;
      an operating beam connected to the second one of the transversal edges of the sunscreen;
      two positioning members, wherein each positioning member has a stationary position relative to said second transversal edge and extends into a corresponding one of said opposed longitudinal guides, and wherein each of the opposed longitudinal edges of the sunscreen near to the second one of the transversal edges is provided with a wing folded inwards around a positioning member, wherein each of the positioning members extend only along a portion of each respective longitudinal edge of the sunscreen, each portion being proximate the operating beam and substantially less than a longitudinal length of the respective longitudinal edge.

16. The roof assembly kit for a vehicle according to claim 15, wherein the longitudinal guides each comprise two guide channels positioned one above the other, and wherein each positioning member extends in a first one of said two guide channels, whereas the operating beam comprises opposite lateral ends each extending into a corresponding second one of said two guide channels.

17. The roof assembly kit for a vehicle according to claim 16, wherein each positioning member extends in a lower one of said two guide channels, whereas each of the lateral ends of the operating beam extends into a corresponding upper one of said two guide channels.

18. The roof assembly kit for a vehicle according to claim 15, wherein said positioning member comprises a lip projecting into the corresponding guide and wherein the corresponding wing of the longitudinal edge of the sunscreen is folded around said lip.

19. The roof assembly kit for a vehicle according to claim 15, wherein said positioning member is connected to the operating beam in a releasable manner.

20. The roof assembly kit for a vehicle according to claim 19, wherein the positioning member together with the operating beam defines a snap connection.

21. The roof assembly kit for a vehicle according to claim 15, wherein said positioning member is an integral part of the operating beam being formed from a single unitary body.

22. The roof assembly kit for a vehicle according to claim 15, comprising two longitudinal drive members housed in longitudinal guides engaging opposite ends of the operating beam and capable of a reciprocating movement in said guides.

23. The roof assembly kit for a vehicle according to claim 15, wherein each longitudinal edge of the sunscreen is folded inwards such that the folded part thereof is positioned above the unfolded part thereof.

24. The roof assembly kit for a vehicle according to claim 15, wherein the wing is an integral prolongation of the sunscreen being formed from a single unitary body.

25. The roof assembly kit for a vehicle according to claim 15, wherein the wing is a separate part attached to the sunscreen.

26. The roof assembly for a vehicle according to claim 15 wherein at least a portion of each wing engages the positioning member so that the wing will not shift relative to the positioning member.

27. The roof assembly for a vehicle according to claim 26 wherein each positioning member comprises an aperture and wherein opposed surfaces of each corresponding wing are secured together through the aperature.

28. The roof assembly for a vehicle according to claim 27 wherein each aperture comprises a recess extending from a longitudinal edge of each corresponding positioning member.

* * * * *